United States Patent [19]
Hirano

[11] Patent Number: 5,371,789
[45] Date of Patent: Dec. 6, 1994

[54] MULTI-CHANNEL ECHO CANCELLATION WITH ADAPTIVE FILTERS HAVING SELECTABLE COEFFICIENT VECTORS

[75] Inventor: Akihiro Hirano, Tokyo, Japan

[73] Assignee: NEC Corporation, Tokyo, Japan

[21] Appl. No.: 12,125

[22] Filed: Feb. 1, 1993

[30] Foreign Application Priority Data

Jan. 31, 1992 [JP] Japan .................. 4-046185

[51] Int. Cl.$^5$ ........................... H04B 3/23
[52] U.S. Cl. .................. 379/410; 379/411; 370/32.1
[58] Field of Search ............ 379/388, 389, 390, 406, 379/407, 410, 411; 370/32, 32.1

[56] References Cited

U.S. PATENT DOCUMENTS

| | | | |
|---|---|---|---|
| 4,577,309 | 3/1986 | Barazeche et al. | 370/32.1 |
| 4,609,787 | 9/1986 | Horna | 379/410 |
| 4,862,449 | 8/1989 | Hoefkens et al. | 379/411 |
| 4,935,919 | 6/1990 | Hiraguchi | 379/410 |
| 4,947,425 | 8/1990 | Grizmala et al. | 379/410 |
| 4,956,838 | 9/1990 | Gilloire et al. | 379/388 |
| 5,018,134 | 5/1991 | Kokubo et al. | 379/410 |

FOREIGN PATENT DOCUMENTS

| | | | |
|---|---|---|---|
| 0111938 | 6/1984 | European Pat. Off. | 379/411 |
| 0120733 | 6/1987 | Japan | 379/410 |
| 0125722 | 6/1987 | Japan | 379/410 |

OTHER PUBLICATIONS

Hirano et al., "A Compact Multi-Channel Echo Canceller with a Single Adaptive Filter Per Channel," IEEE International Symposium on Circuits and Systems, pp. 1922-1925 (1992).

Primary Examiner—James L. Dwyer
Assistant Examiner—M. N. Shehata
Attorney, Agent, or Firm—Foley & Lardner

[57] ABSTRACT

A multi-channel echo canceller comprises a set of subtractors connected respectively in communication channels for respectively receiving a signal from a respective microphone and cancelling an echo contained in it with a cancelling signal, and a set of adaptive filters associated respectively with the subtractors. Each adaptive filter has a set of vectors of filter coefficients. A time difference between propagation delays of the received signals is estimated, and a signal having the largest content of echo components is selected and applied to the adaptive filters. One of coefficient vectors is identified according to the estimated time difference and the selected signal. Each adaptive filter varies its filter coefficients of the identified vector with a correction term proportional to the output of the associated subtractor for filtering the selected signal using the coefficients of the identified vector to derive an echo replica, which is supplied to the associated subtractor as the cancelling signal.

25 Claims, 9 Drawing Sheets

Controller 103

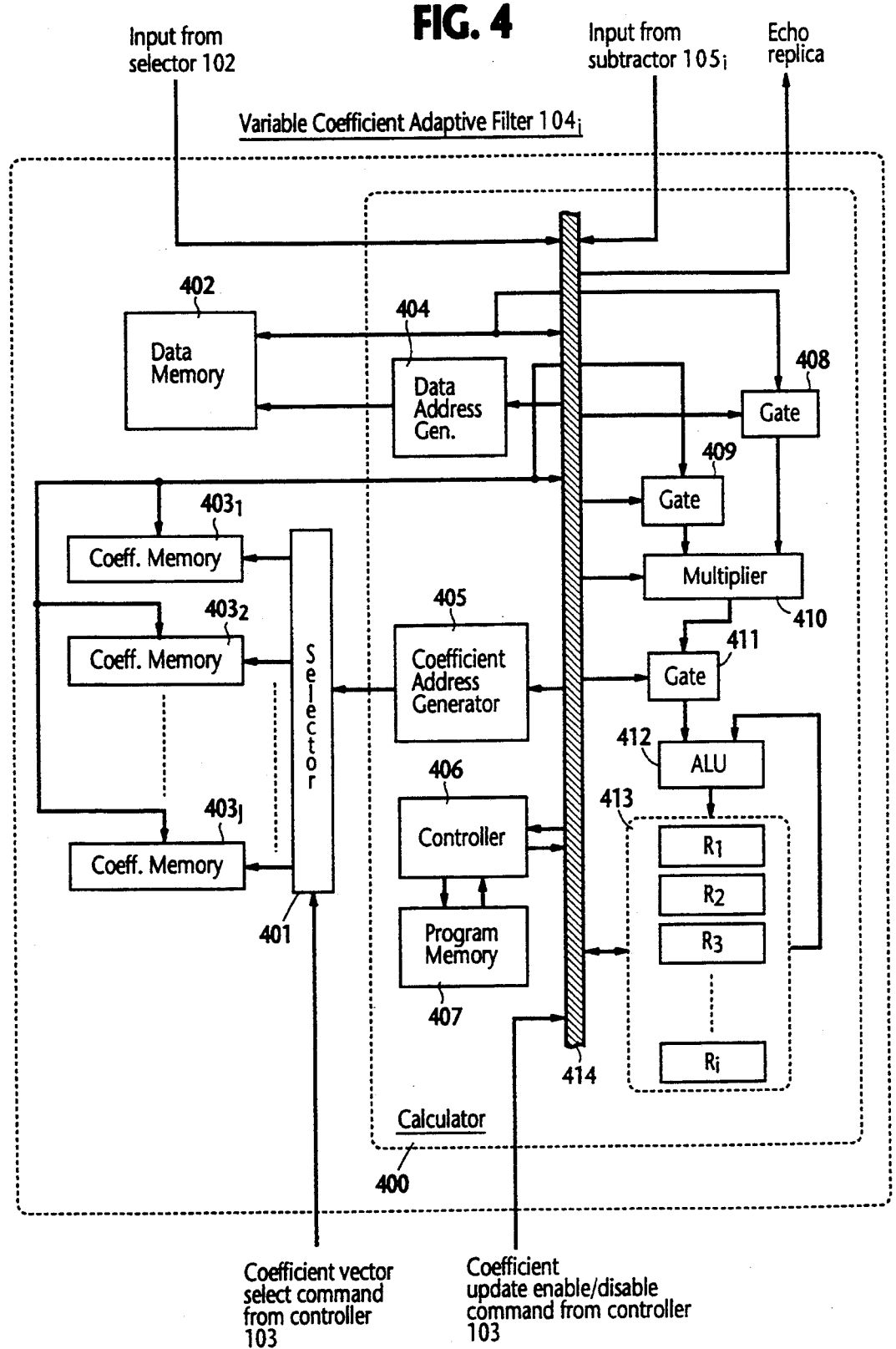

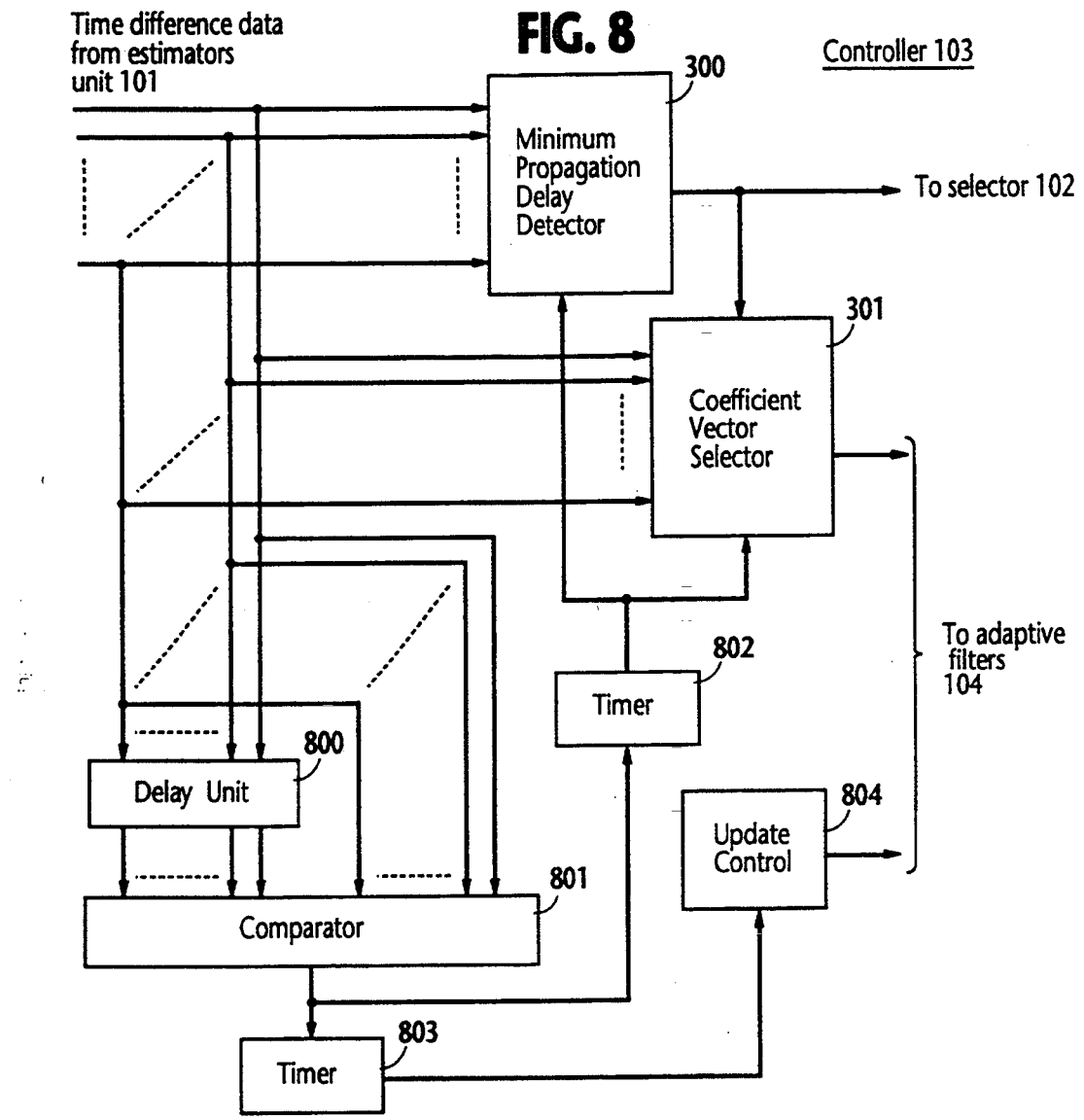

MULTI-CHANNEL ECHO CANCELLATION WITH ADAPTIVE FILTERS HAVING SELECTABLE COEFFICIENT VECTORS

BACKGROUND OF THE INVENTION

1. Field of the Invention

The present invention relates generally to echo cancellers, and more specifically to a multi-channel echo canceller for a teleconferencing system and the like.

2Description of the Related Art

A multi-channel echo canceller is described in a paper "Compact Multi-channel Echo Canceller with a Single Adaptive Filter Per Channel", Akihiro Hirano et al, Proceedings of the 1992 IEEE International Symposium on Circuits and Systems, San Diego, Calif. May 10–13, 1992. This paper addresses to the convergence problem that is associated with adaptive filter coefficients when received signals have strong cross-correlation. The known echo canceller is provided with a single set of filter coefficients to reduce acoustic echoes at the near and far ends of the system as well as transmission echoes by taking into account all possible microphone-loudspeaker combinations at the near end and all possible acoustic paths from a talker to microphones at the far end. The known echo canceller estimates an inter-channel time difference between the propagation delays of the received signals and couples one of the signals having a smaller propagation delay to the adaptive filters to produce an echo replica from each adaptive filter. The echo replica is subtracted from a corresponding signal to cancel the echo contained therein. The adaptive filters are controlled with residual echoes so that they reduce to a minimum. The filter coefficients of each adaptive filter define a transfer function that is converged to an optimum value for a particular talker at the far end in response to the selected signal. Therefore, the transfer function of each adaptive filter tends to offset from the optimum value in response to a talker's movement. However, there is a noticeable amount of delays in the adaptive filters for adapting to the changing acoustic parameters at the far end.

SUMMARY OF THE INVENTION

It is therefore an object of the present invention to provide a multi-channel echo canceller that can quickly adapt itself to changing acoustic parameters at the far end of a communication channel.

According to the present invention, there is provided an echo canceller for a teleconferencing system having a plurality of transmit and receive channels interconnecting separated conference rooms, each of the conference rooms having a set of microphones and a set of loudspeaker. The echo canceller is located in each conference room and comprises a plurality of subtractors connected respectively in the transmit channels for respectively receiving a transmit signal from the respective microphone and cancelling an echo contained in the transmit signal with a cancelling signal, and a plurality of adaptive filters associated respectively with the subtractors. Each adaptive filter has a plurality of vectors of filter coefficients. A time difference between propagation delays of distant signals is estimated, and a distant signal having the largest content of echo components or a minimum propagation delay is applied to the adaptive filters and one of the vectors is identified according to the estimated time difference and the selected signal. Each adaptive filter varies its filter coefficients of the identified vector with a correction term proportional to the output of the associated subtractor and filters the selected signal using the coefficients of the identified vector to derive an echo replica, which is supplied to the associated subtractor as the cancelling signal.

In response to a talker's movement at the far end of the communication channel, the filter coefficients of each adaptive filter are quickly switched from one vector to another. Therefore, the echo canceller of this invention can quickly adapt itself to changes in the far-end acoustic parameters.

BRIEF DESCRIPTION OF THE DRAWINGS

The present invention will be described in further detail with reference to the accompanying drawings, in which:

FIG. 4 is a block diagram of a variable coefficient adaptive filter;

FIG. 8 is a block diagram of the controller of the echo canceller according to a modified embodiment of the present invention; and FIG. 9 is a timing diagram associated with the modification of FIG. 8.

DETAILED DESCRIPTION

Figure 1:
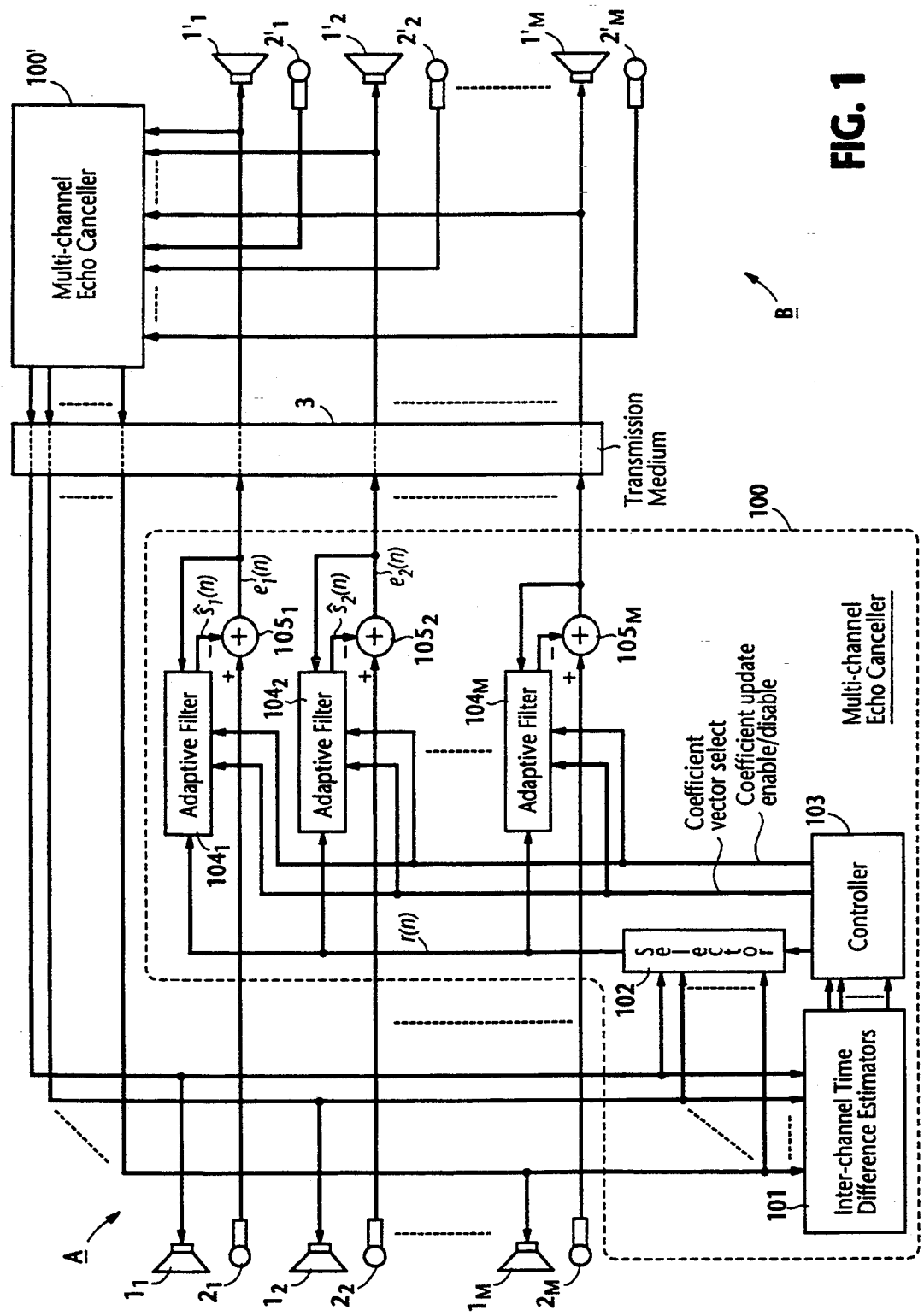
FIG. 1 is a block diagram of a teleconferencing system incorporating multi-channel echo cancellers of the present invention.

Referring now to FIG. 1, there is shown a teleconferencing system embodying a multi-channel echo canceller of a first embodiment of the present invention. The teleconferencing system comprises a plurality of loudspeakers $1_1 \sim 1_M$ and microphones $2_1 \sim 2_M$ positioned in a conference room A and a like plurality of loudspeakers $1'_1 \sim 1'_M$ and microphones $2'_1 \sim 2'_M$ positioned in a distant conference room B. The loudspeakers 1 and microphones 2 are formed into a plurality of sets, or channels corresponding respectively to a plurality of sets of loudspeakers 1' and microphones 2'. The speaker and microphone of each set in conference room A are connected to a multi-channel echo canceller 100. The outputs of echo canceller 100 are connected by way of a transmission medium 3 to the corresponding set of microphone and speaker in conference room B, and are further connected to an identical multi-channel echo canceller 100' to which signals from microphones 1' are also applied. The outputs of echo canceller 100' are connected through transmission medium 3 to the speaker/microphone sets of conference room A, and further to the echo canceller 100. Therefore, the input signals to all loudspeakers 1 and 1' are supplied to the echo canceller 100 and 100', respectively, to form a plurality of closed loops for purposes of cancelling inter-channel echoes.

Echo canceller 100 at the site of conference room A comprises an inter-channel time difference estimators unit 101 to which the M receive-channel inputs from conference room B are terminated in parallel to connections to loudspeakers $1_1 \sim 1_M$. The same receive-channel inputs are also applied to inputs of a channel selector 102. A controller 103 is connected to the outputs of inter-channel time difference estimators unit 101 to provide a channel selection signal to selector 102. Variable coefficient adaptive filters $104_1 \sim 104_M$ are associated respectively with subtractors $105_1 \sim 105_M$ and with transmit channels or microphones $2_1 \sim 2_M$ to receive a speech signal input from the channel selector 102 to generate a signal which is a replica of an echo contained in the signal applied to the associated subtractors 105.

Subtractors $105_1 \sim 105_M$ are connected in the transmit channels to receive speech signals from corresponding microphones $2_1 \sim 2_M$ as well as the echo replicas from the associated adaptive filters $104_1 \sim 104_M$, respectively. The outputs of the subtractors $105_1 \sim 105_M$, each containing a speech signal and an undesired residual echo, are transmitted through transmission medium 3 and respectively coupled to loudspeakers $1'_1 \sim 1'_M$ at site B, and returned through echo canceller 100' to site A and applied to the inter-channel time difference estimators unit 101 and channel selector 102. The outputs of the subtractors $105_1 \sim 105_M$ are also applied to the corresponding adaptive filters $104_1 \sim 104_M$ as feedback signals to adaptively control their filter coefficients.

Each adaptive filter 104 has a plurality of vectors of filter coefficients. In each adaptive filter, one of its filter coefficient vectors is selected in response to a coefficient vector select command from controller 103. Controller 103 further applies a coefficient update enable or disable command to each adaptive filter 104.

Figure 2:
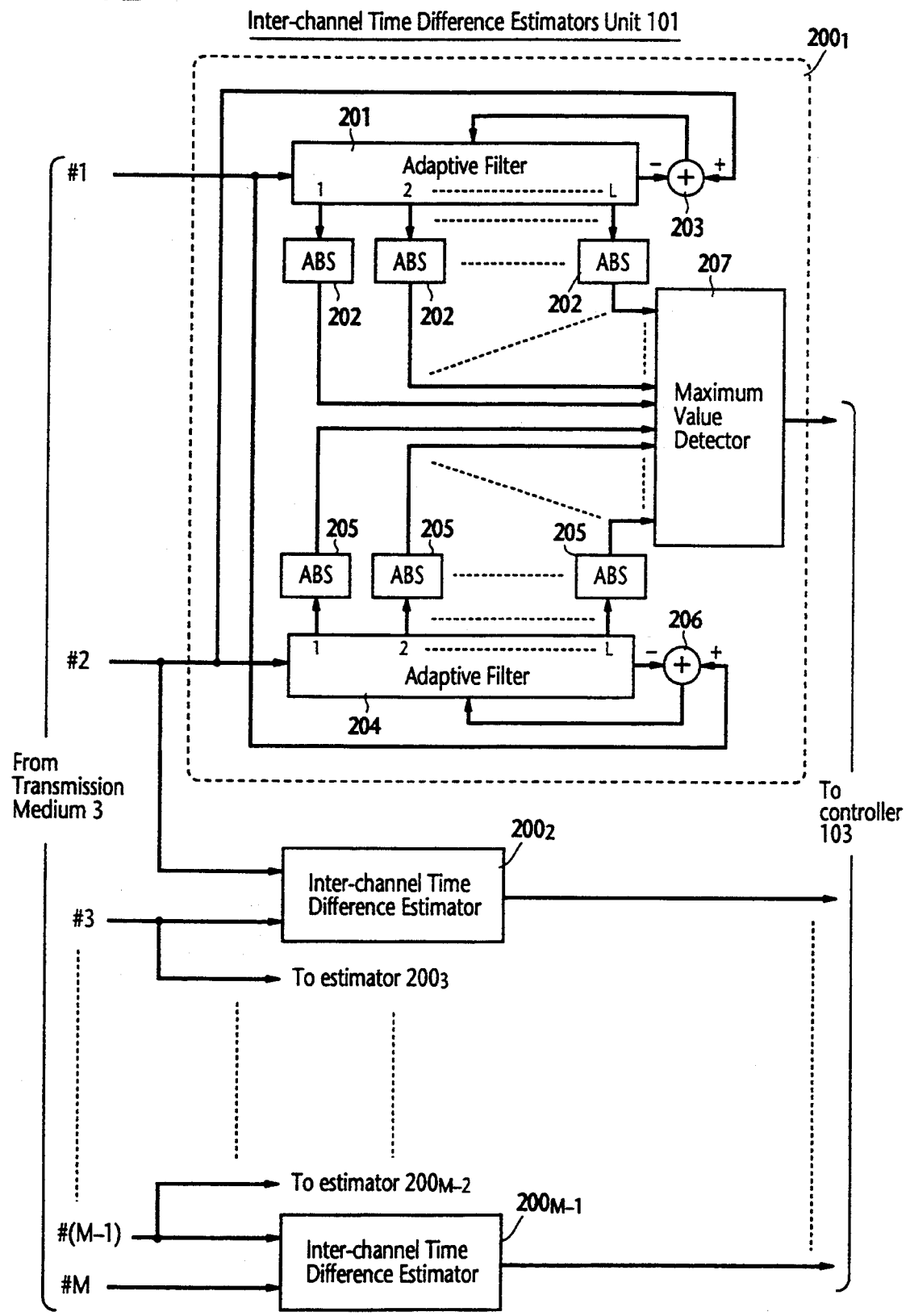
FIG. 2 is a block diagram of an inter-channel time difference estimators unit of a multi-channel echo canceller according to a first embodiment of the present invention.

As shown in FIG. 2, the inter-channel time difference estimators unit 101 comprises (M-1) inter-channel time difference estimators $200_1 \sim 200_{M-1}$, each being connected to receive speech signals from a corresponding pair of adjacent receive channels. The function of each inter-channel time difference estimator $200_i$ is to estimate the propagation delay time difference between signals transmitted through the i-th and (i+1)th receive channels of the corresponding pair. The estimation of the propagation time difference between the signals of adjacent channels is achieved by the use of two adaptive filters associated respectively with the adjacent channels. The adaptive filter is typically of a tapped-delay line filter structure that consists of a set of delay elements, a set of multipliers connected to the delay-line taps, a corresponding set of adjustable tap weights and a summer for adding the multiplier outputs. It involves detecting the difference between the output of each adaptive filter and the input of the other adaptive filter to produce an error signal, adjusting the tap weights of each adaptive filter in a recursive manner by updating the present estimate of each tap weight with a correction term proportional to the error signal at that time, and detecting a maximum value of the tap weights (or filter coefficients) of the adaptive filters. If an adaptive filter receives a signal of shorter propagation delay and produces an estimate of a signal of longer propagation delay, one of its filter coefficients corresponds to a delay closest to the wanted difference and such a filter coefficient has a maximum absolute value. Conversely, if it receives a signal of longer propagation delay and produces an estimate of a signal of shorter propagation delay, its filter coefficients have lower absolute values.

To this end, each inter-channel time difference estimator $200_i$ comprises an adaptive filter 201 having an input port connected to the i-th receive channel and L taps respectively connected to absolute-value conversion circuits 202. The output port of the adaptive filter 201 is connected to the negative input terminal of a subtractor 203 whose positive input terminal is connected to the (i+1)th receive channel. The output of the subtractor 203 is applied to the control port of the adaptive filter 201. The outputs of all absolute-value conversion circuits 202 are supplied to a decision circuit or maximum value detector 207 where a maximum of the input absolute values is detected. In like manner, the (i+1)th receive channel is connected to the input of an adaptive filter 204 whose L taps are respectively connected to absolute-value conversion circuits 205 whose outputs are connected to the maximum value detector 207. The output port of adaptive filter 204 is applied to the negative input of a subtractor 206 whose positive input is connected to the i-th receive channel. Each of the adaptive filters 201 and 204 is controlled by the output of the corresponding one of the subtractors 203 and 206 so that the output of each subtractor is reduced to a minimum.

Using the detected maximum absolute value, the maximum value detector 207 of each inter-channel time difference estimator $200_i$ produces an output which represents an estimate of the propagation time difference between the signals of the i-th and (i+1)th channels. In this way, a set of (M-1) propagation time differences are produced and applied to the controller 103.

Figure 3:
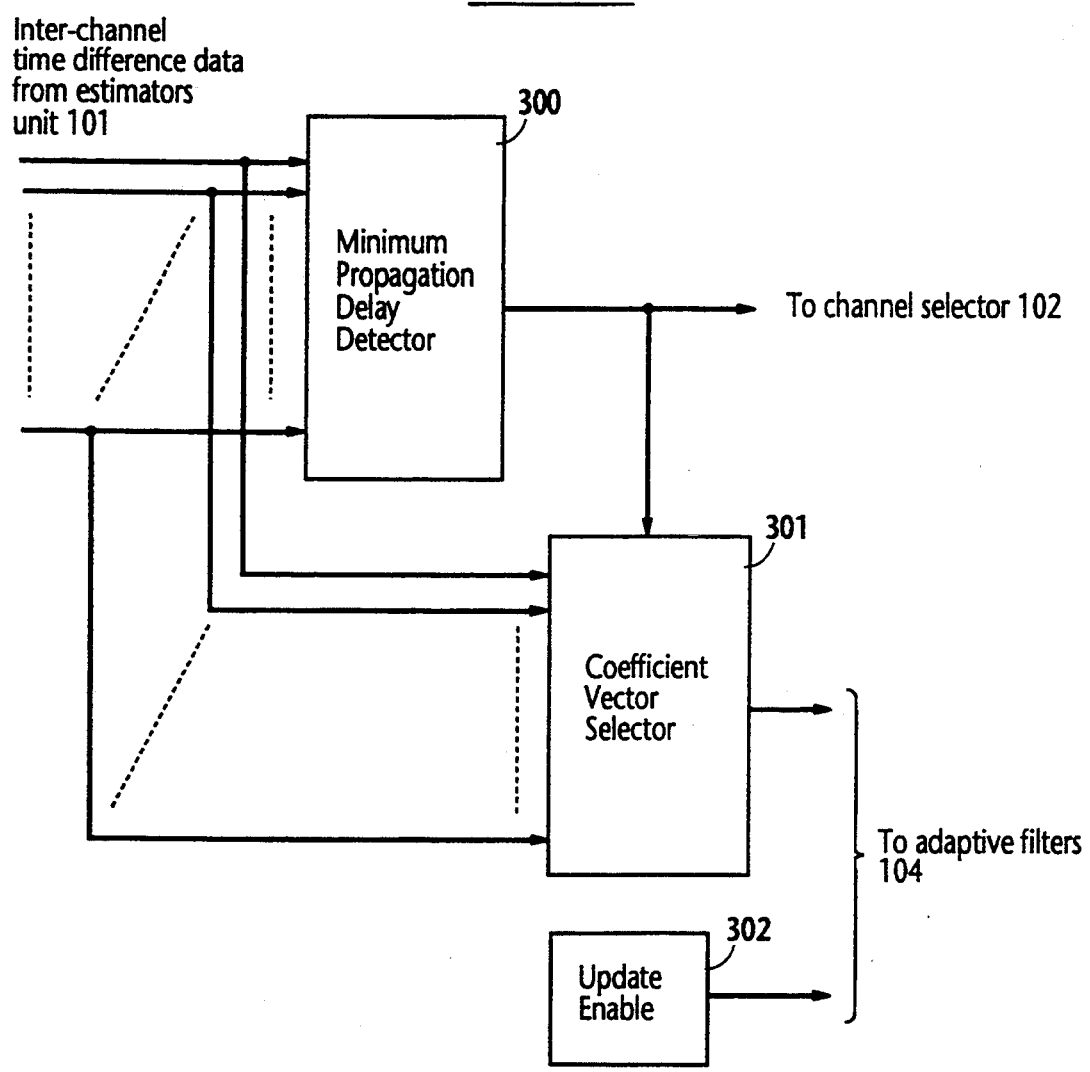
FIG. 3 is a block diagram of a controller of the echo canceller.

As illustrated in FIG. 3, the controller 103 includes a minimum propagation delay detector 300 which receives the outputs of interchannel time difference estimators unit 101 to detect a minimum time difference value, selects one of the signals on the receive channels having a minimum propagation delay, and supplies a channel select signal to the channel selector 102 to cause it to pass the selected signal to all adaptive filters 104 as a signal having a largest content of echo components.

The channel selection signal is applied to a coefficient vector selector 301 to which the outputs of inter-channel time difference estimators unit 101 are also applied. Using the channel selection signal as an identification of the detected minimum propagation delay and the time difference estimates, coefficient vector selector 301 determines the amount of time by which each of the receive signals is delayed with respect to the signal having the minimum propagation delay by calculating the following Equations (1) and (2).

If the time difference between the i-th signal and any of arbitrarily chosen j-th receive signal is denoted as $t_{i,j}$, then the time difference between signals (i- and k-th) of any possible pairs is given by the relation $t_{i,k} = t_{j,k}$. Therefore, if $i<j$, the time difference $t_{i,j}$ for a set of time differences $t_{1,2}, t_{2,3}, t_{3,4}, \ldots, t_{M-1,M}$ is given by:

$$t_{i,j} = \sum_{k=i+1}^{j} t_{k-1,k} \qquad (1)$$

and if $i>j$, the time difference $t_{i,j}$ is given by:

$$t_{i,j} = \sum_{k=j+1}^{i} t_{k-l,k} \quad (2)$$

Therefore, if the i-th signal is identified as having a minimum propagation delay time, it can be said without loss of generality that the time difference $t_{i,j}$ assumes one of integers 0, 1, . . . $t_{max}$ in the discrete time domain. Since there is a maximum of $(t_{max}+1)^M$ permutations if M integers are selected (provided that repeated selection is allowed), there is a maximum of $(t_{max}+1)^M$ sets of time differences $(t_{i,1}, t_{i,2}, t_{i,3}, \ldots, t_{i,M})$ for a signal having a minimum propagation delay. Therefore, each variable coefficient adaptive filter $104_i$ (where i=1, 2, . . . M, FIG. 1)/has $(t_{max}+1)^M$ vectors of filter coefficients corresponding respectively to the time differences $(t_{i,1}, t_{i,2}, t_{i,3}, \ldots, t_{i,M})$. Using the output of minimum propagation delay detector 300 as a variable i and successively incrementing an input variable j, coefficient vector selector 301 calculates the following Equation:

$$\sum_{j=1}^{M} (t_{max} + 1)^{j-1} t_{i,j} + 1 \quad (3)$$

to select one of the $(t_{max}+1)^M$ filter coefficient vectors and supplies a coefficient vector select command to all adaptive filters $104_1$-$104_M$.

Controller 103 further includes an update enable control circuit 302 to supply an enable command to all adaptive filters to cause them to constantly update their filter coefficients. The enable control circuit 302 is implemented with a register or the like.

Details of each variable coefficient adaptive filter $104_j$, FIG. 1, are shown in FIG. 4. The adaptive filter $104_i$ comprises a calculator 400 for performing convolution calculations, a selector 401, a data memory 402 and a plurality of filter coefficient memories $403_1 \sim 403_j$ each storing a vector of filter coefficients. Selector 401 selects one of the filter coefficient memories 403 in response to the coefficient vector select command from controller 103 to supply the filter coefficients of the selected vector to the calculator 400. Calculator 400 includes a data address generator 404 for generating address data for the data memory 402 and a coefficient address generator 405 for generating address data for the coefficient memories 403. A controller 406 is connected to a program memory 407 to provide overall control of the calculator through common bus 414 using gates 408, 409, 411, multiplier 410, arithmetic and logic unit (ALU) 412 and a register bank 413 of registers $R_1-R_i$. The channel input from selector 102 and the residual echo signal from subtractor $105_i$ are applied to a common bus 414 from which the echo replica of the adaptive filter is taken.

Using the control program stored in memory 407, the controller 406 operates according to flowcharts shown in FIGS. 5A, 5B, 6A and 6B.

Figure 5A:
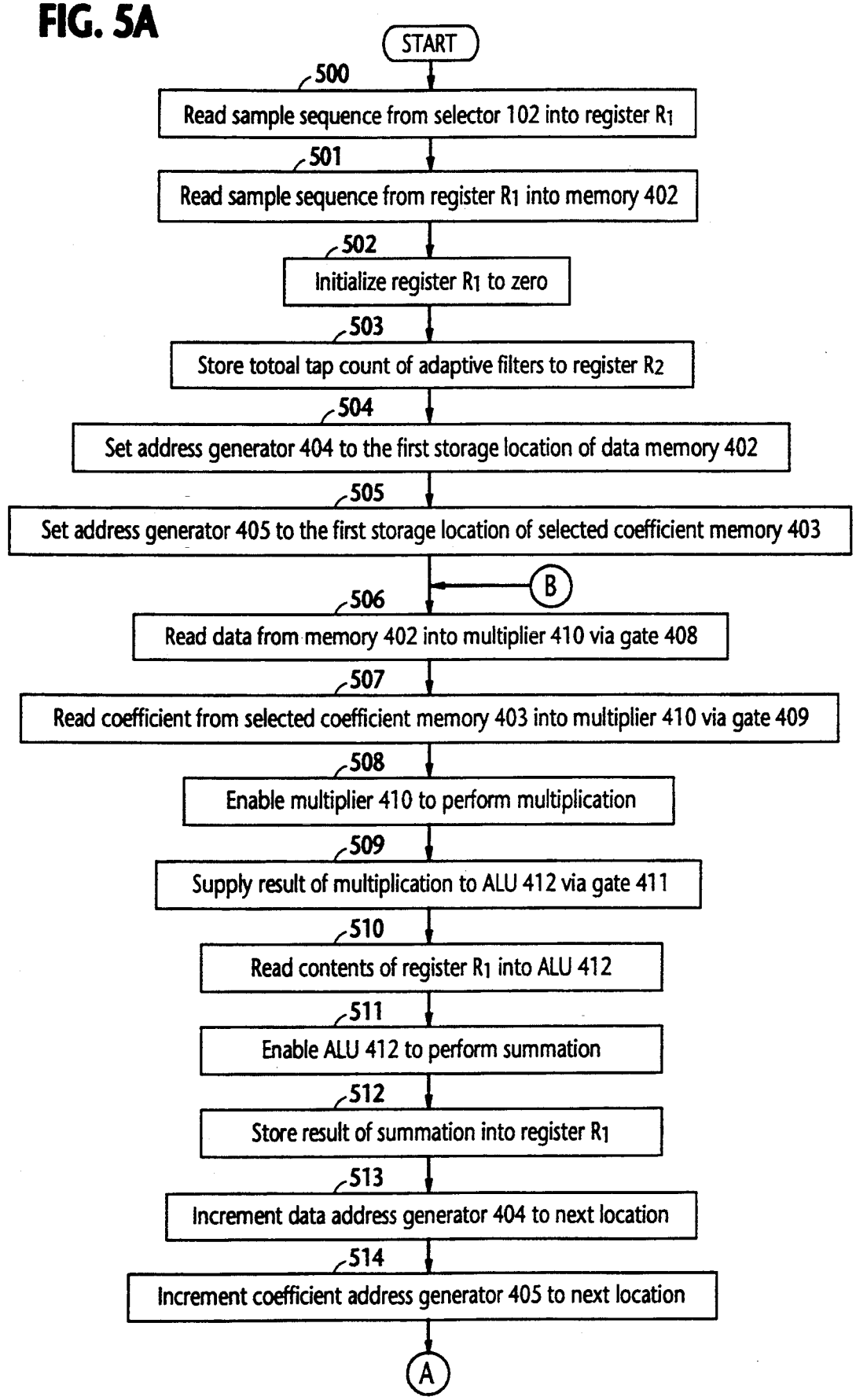
FIGS. 5A and 5B are flowcharts describing a sequence of operations performed by the calculator of the adaptive filter for generating an echo replica.
Figure 5B:
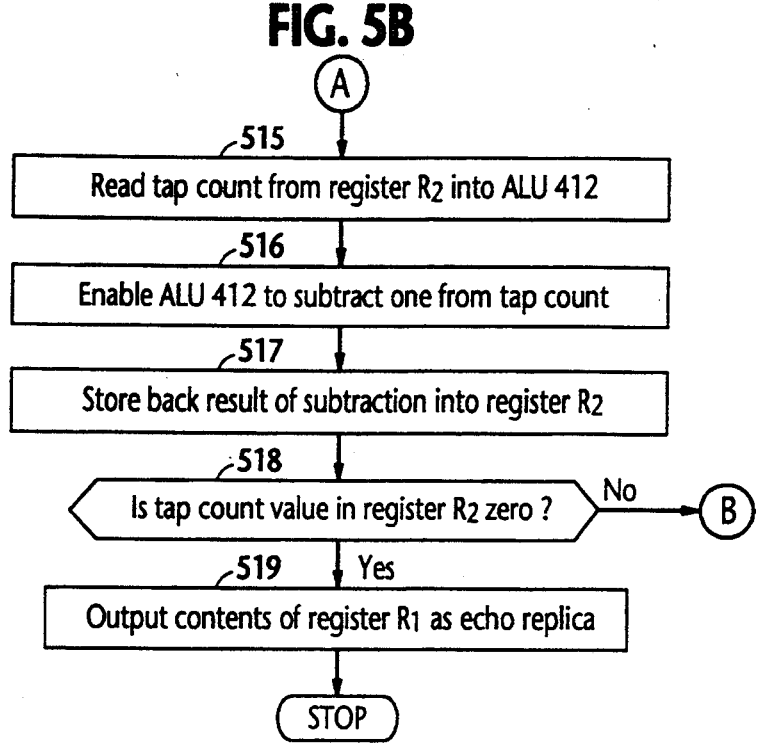

In FIGS. 5A and 5B, controller 406 is programmed to proceed as follows to generate an echo replica. A sequence of data samples from selector 102 are first read in and temporarily stored into register $R_1$ of register bank 413 (step 500) and the samples so stored in register $R_1$ are then transferred to data memory 402 (step 501). Register $R_1$ is then initialized to zero (step 502) and a total tap count of the adaptive filter is stored into register $R_2$ (step 503). Data address generator 404 is set to the first storage location of data memory 402 (step 504) and coefficient address generator 405 is set to the first address location of one of the coefficient memories 403 which is selected by the vector select command from the controller 103 (step 505).

Gate 408 is enabled and a data sample is read out of the first storage location of the data memory into multiplier 410 via gate 408 (step 506). Gate 409 is enabled and a filter coefficient is read out of the first storage location of the selected coefficient memory 403 into multiplier 410 via gate 409 (step 507). Controller 406 enables multiplier 410 to perform multiplication operations on the input data (step 508) and the result of the multiplication is supplied to ALU 412 via gate 411 (step 509). The contents of register $R_1$ (which are zero in the first pass of loop operation) are read and stored into ALU 412 (step 510) and summed with the result of multiplication (step 511). The result of summation is stored into register $R_1$ (step 512) and the address generators 404 and 405 are incremented to their next storage location (steps 513, 514). The tap count value is then read out of register $R_2$ and supplied to ALU 412 (step 515) and the latter is enabled to subtract one from the tap count (step 516), the result of subtraction being stored back into register $R_2$ (step 517). Control proceeds to decision step 518 to determine whether the tap count value of register $R_2$ is equal to zero.

If the answer at step 518 is negative, control returns to step 506 to repeat the process by reading a next data sample and a next filter coefficient (steps 506, 507), multiplying them together (step 508), and updating the previous sum in register $R_1$ by adding to it the current multiplication result (steps 509 to 517). When the tap count is reduced to zero, control branches at step 518 to step 519 to output the total sum from register $R_1$ as an echo replica.

Figure 6B:
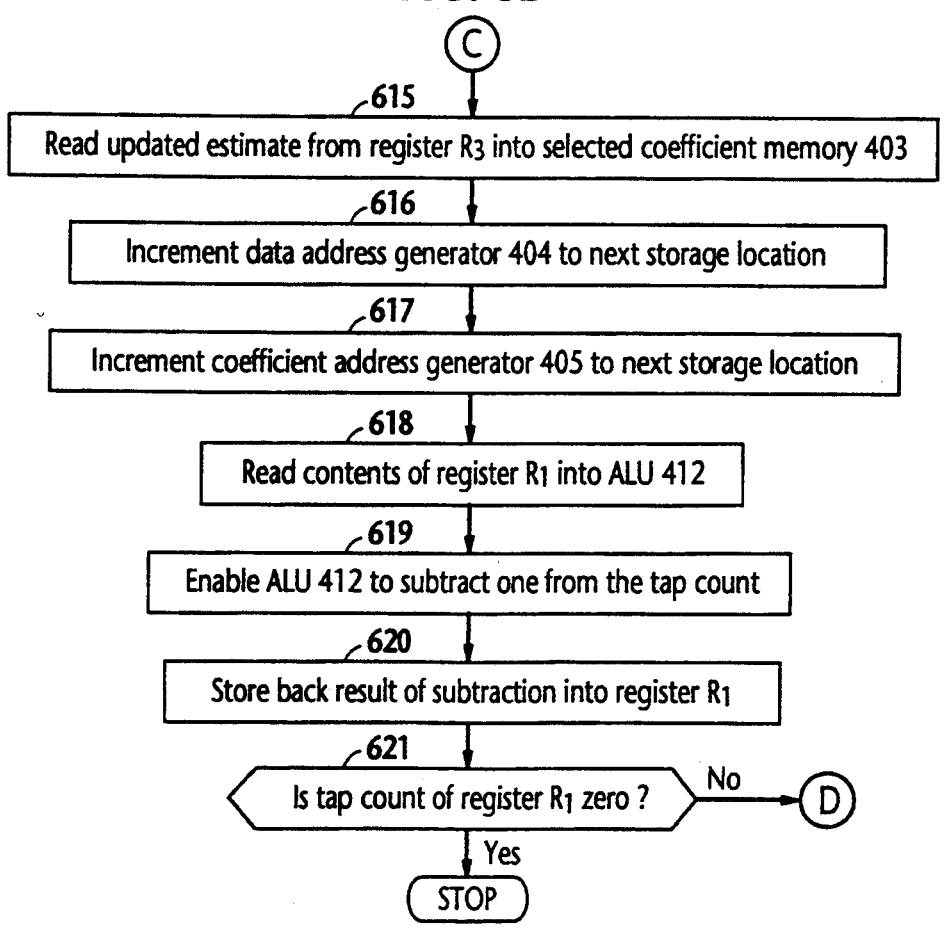
FIGS. 6A and 6B are flowcharts describing a sequence of operations performed by the calculator of the adaptive filter for updating filter coefficients.
Figure 6A:
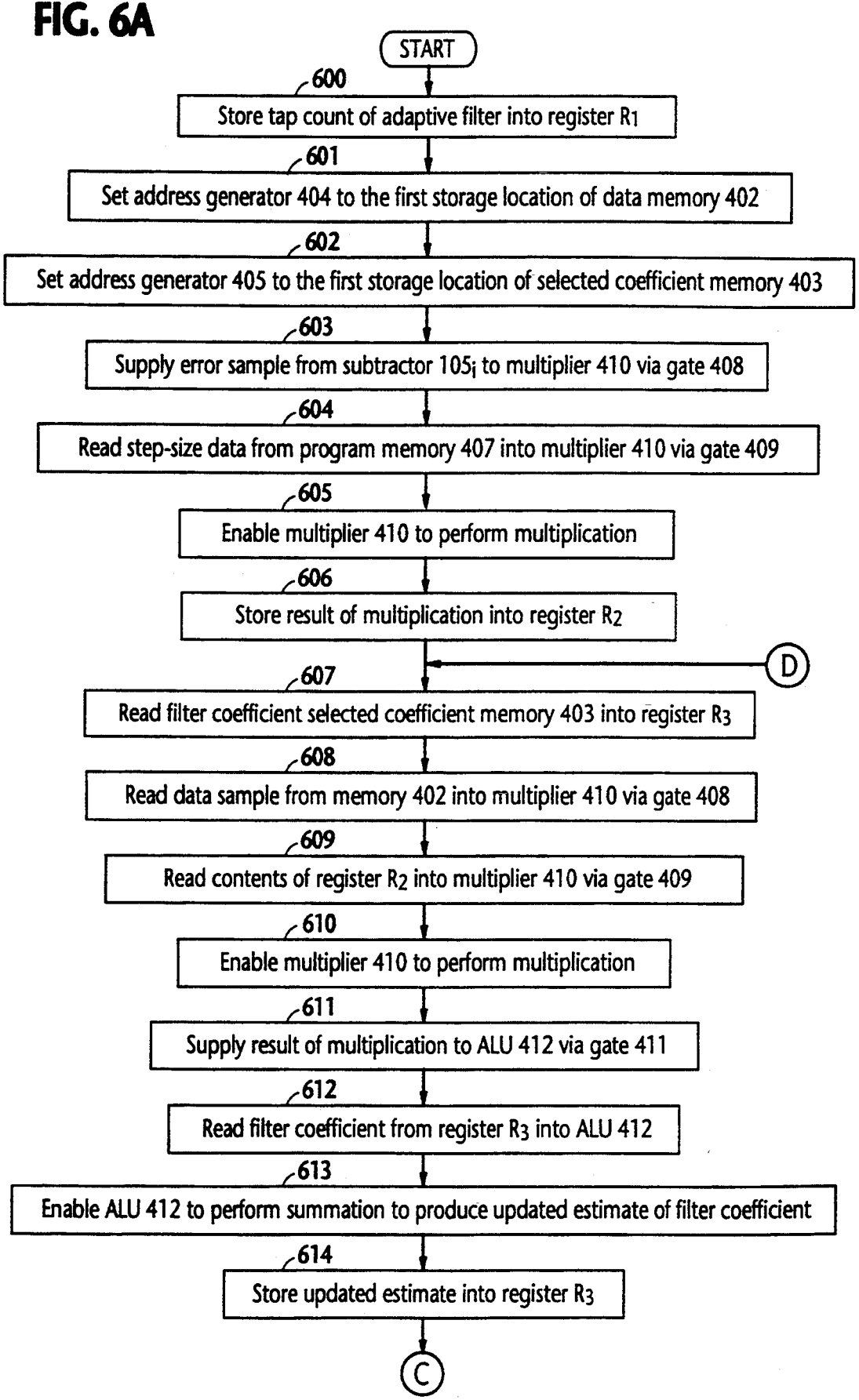

In FIGS. 6A and 6B, controller 406 is further programmed to proceed as follows to update the filter coefficients of a selected coefficient memory 403 when the calculator 400 is supplied with a coefficient update command from controller 103. Coefficient update execution starts with step 600 by storing the total tap count of adaptive filter into register $R_1$. Address generator 404 and 405 are set to the first location of data memory 402 and the first location of the selected coefficient memory 403, respectively, (steps 601, 602). Gate 408 is enabled and an error sample is read in from subtractor $105_i$ and supplied to multiplier 410 via gate 408 (step 603). A step-size value is read out of program memory 407 into multiplier 410 via gate 409 (step 604) and multiplier 410 is enabled to multiply the step-size value with the error sample (step 605). The result of the multiplication is stored into register $R_2$ (step 606).

Control proceeds to step 607 to read a filter coefficient from the coefficient memory 403 that is selected by vector select command from controller 103 and store it into register $R_3$ as an old estimate of a filter coefficient. A data sample is read from memory 402 into multiplier 410 via gate 408 (step 608) and the product of the step-size and error sample, now stored in register $R_2$, is read and applied to multiplier 410 via gate 409 (step 609) where it is multiplied with the data sample (step 610). The result of the multiplication is supplied via gate 411 to ALU 412 (step 611) where it is summed with the filter coefficient stored in register $R_3$ (steps 612, 613), producing an updated, or present estimate of the filter coefficient. The updated estimate is stored back into register $R_3$ (step 614) and the old coefficient value in the selected coefficient memory 403 is updated with the present coefficient value stored in register $R_3$ (step 615). Both address generators 404, 405 are then incremented to the next storage location (steps 616, 617) and the tap count is read from register $R_1$ into ALU 412 (step 618) where it is decremented by one (step 619) and stored back into register $R_1$ (step 620). Control proceeds to decision step 621 to check to see if the tap count is reduced to zero. If the answer is negative, control returns to step 607 to continue the updating process on subsequent data samples and corresponding filter coefficients until the tap count reduces to zero so that the old estimates of filter coefficients are all updated.

Consider a case of two channels, a time difference between receive channels #1 and #2, the adaptive filter $104_1$ will produce an echo replica $\hat{s}_1(n)$ as given by Equation (4) as follows:

$$\hat{s}_1(n) = \sum_{i=0}^{N-1} w_{1,nd}(i,n) \cdot r(n-i) \quad (4)$$

where, n is the sample point, $w_{1,nd}(i,n)$ is the filter coefficient at tap-point i of a vector of adaptive filter $104_1$ which vector is selected in response to an inter-channel time difference $n_d$ at sample point n (note that, in the case of more than two channels, Equation (3) is used to identify the vector to be selected), and $r(n-i)$ is the output of selector 102 at sample point $(n-i)$, and N is the total number of taps (tap count) of the adaptive filter. Likewise, the adaptive filter $104_2$ will produce an echo replica $\hat{s}_2(n)$ as given by Equation (5):

$$\hat{s}_2(n) = \sum_{i=0}^{N-1} w_{2,nd}(i,n) \cdot r(n-i) \quad (5)$$

where $w_{2,nd}(i,n)$ is the filter coefficient at tap-point i of a vector of adaptive filter $104_2$.

Old estimates of filter coefficients $w_{1,nd}(i,n)$ and $w_{2,nd}(i,n)$ are updated to new coefficients $w_{1,nd}(i,n+1)$ and $w_{2,nd}(i,n+1)$, respectively, as follows:

$$w_{1,nd}(i,n+1) = w_{1,nd}(i,n) + \mu e_1(n) \cdot r(n-i) \quad (6)$$

$$w_{2,nd}(i,n+1) = w_{2,nd}(i,n) + \mu e_2(n) \cdot r(n-i) \quad (7)$$

where $\mu$ is the step-size, $e_1(n)$ and $e_2(n)$ are error samples from subtractors $105_1$ and $105_2$, respectively. As the filter coefficients $w_{k,nd}(i,n)$ of each selected vector are adaptively updated with a correction term proportional to a corresponding error signal $e_k(n)$, each filter coefficient assumes a unique value.

When a talker moves his position with respect to his microphone, the acoustic transfer function of the passage of the speech sound varies accordingly and with it the filter coefficients of each adaptive filter are instantly switched from one vector to another. Therefore, the multi-channel echo canceller of this invention can quickly adapt itself to changes in delay time differences resulting from talker's movement.

A number of modifications are possible without altering the scope of the present invention. Inter-channel time difference estimation is also achieved by the use of a cross-correlation technique as follows.

Assume that data samples $x_1(n)$ and $x_2(n)$ are received on two adjacent receive channels at time n with a time difference m therebetween. Cross-correlation function $R_{12}(n,m)$ for the two data samples is given by:

$$R_{12}(n,m) = E[x_1(n) \cdot x_2(n+m)] \quad (8)$$

If $x_2(n) = x_1(n-n_d)$, the following relations hold:

$$E[(x_1(n) - x_2(n+m))^2] = \quad (9)$$

$$E[(x_1(n) - x_1(n - n_d + m))^2] =$$
$$E[x_1^2(n)] - 2E[x_1(n) \cdot x_2(n+m)] + E[x_2^2(n+m)] =$$

$$E[x_1^2(n)] + E[x_2^2(n+m)] - 2R_{12}(n,m)$$

where $E[.]$ denotes the expected value. Therefore, cross-correlation function $R_{12}(n,m)$ is given by:

$$R_{12}(n,m) = (\tfrac{1}{2})(E[x_1^2(n)] + E[x_2^2(n+m)] - E[(x_1(n) - x_1(n-n_d+m))^2]) \quad (10)$$

since $E[x_1^2(n)]$ and $E[x_2^2(n)]$ are both constant if $x_1(n)$ and $x_2(n)$ are of steady values, the following cross-correlation function $R_{12}(n,m)$ can be obtained:

$$R_{12}(n,m) = (\tfrac{1}{2})\{(C - E[(x_1(n) - x_1(n-n_d+m))^2]\} \quad (11)$$

where $C = E[x_1^2(n)] + E[x_2^2(n+m)]$.

As a result, $R_{12}(n,m)$ is maximum when $m = n_d$. If data samples $x_1(n)$ and $x_2(n)$ are of opposite phase to each other, i.e., $x_1(n) = -x_2(n-n_d)$, the following relations hold:

$$E[(x_1(n) - x_2(n+m))^2] = \quad (12)$$

$$E[(x_1(n) - x_1(n - n_d + m))^2] =$$

$$E[x_1^2(n)] + E[x_2^2(n)] + 2R_{12}(n,m)$$

thus, $R_{12}(n,m)$ becomes:

$$R_{12}(n,m) = -(\tfrac{1}{2})\{C - E[(x_1(n) - x_1(n-n_d+m))^2]\} \quad (13)$$

therefore, $R_{12}(n,m)$ is minimum and its absolute value is maximum when $m = n_d$. The inter-channel time difference m between two signals is estimated by detecting when the cross-correlation function $R_{12}(n,m)$ has a maximum absolute value.

Figure 7:
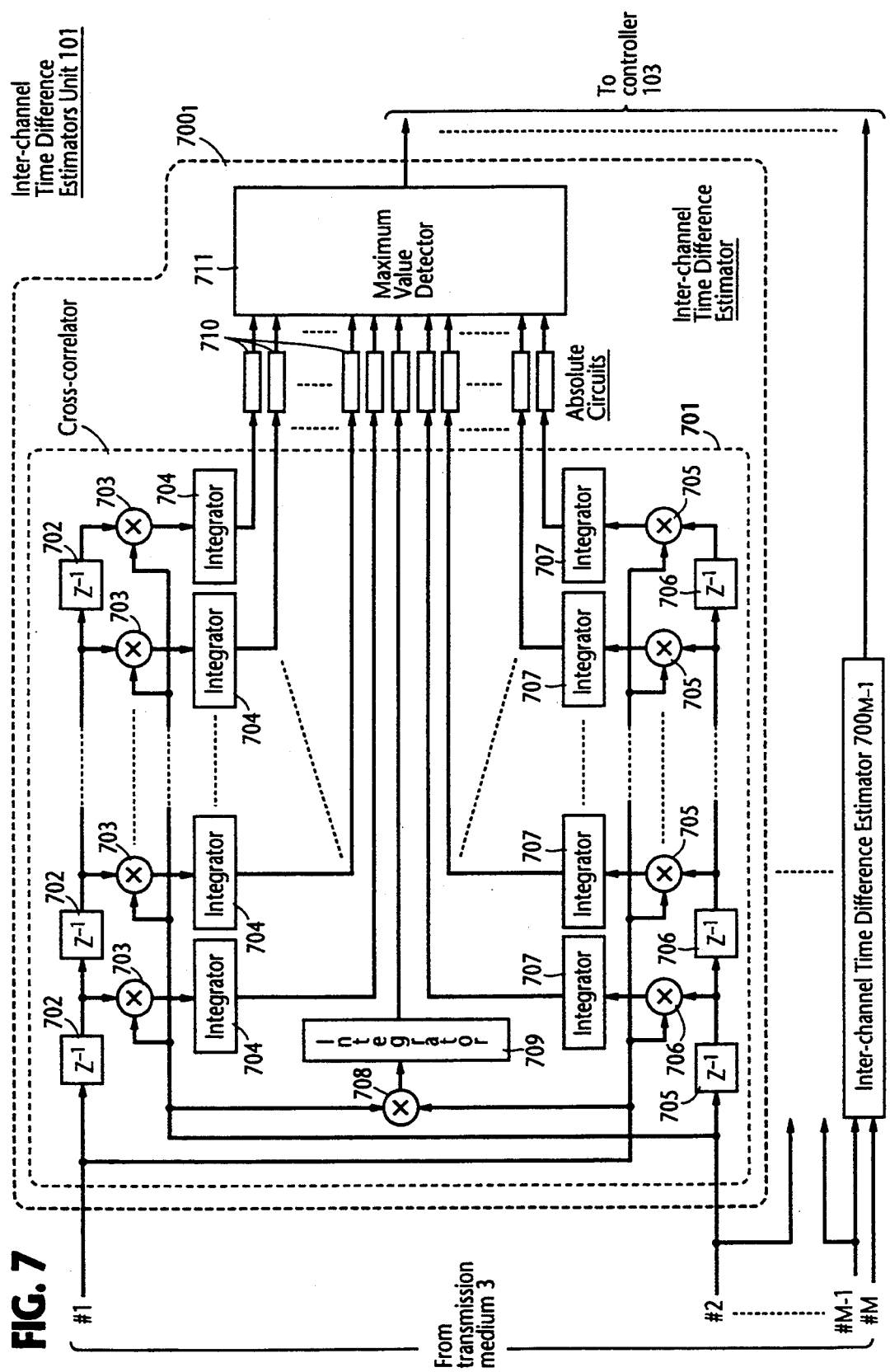
FIG. 7 is a block diagram of an inter-channel time difference estimators unit according to a second embodiment of the present invention.

FIG. 7 is a block diagram of a modified version of the inter-channel time difference estimators units 101. It comprises $(M-1)$ inter-channel time difference estimators $700_1 \sim 700_{M-1}$ associated respectively to a pair of adjacent receive channels $\#1 \sim \#M$. Each estimator $700_i$ comprises a cross-correlator 701, a plurality of absolute value conversion circuits 710 and a maximum value detector 711. The cross-correlator 701 includes a first tapped-delay line formed by unit delay elements 702 connected in series to a first one of the associated pair of receive channels. A plurality of multipliers 703 are connected to the delay-line taps to respectively multiply the successively delayed data samples with a data sample supplied from the other channel of the associated channel pair. The outputs of multipliers 703 are connected to integrators 704, respectively, whose outputs are fed to corresponding ones of absolute value conversion circuits 710. The outputs of integrators 704 respectively indicate the m elements of a cross-correlation function $R_{i,i+1}(n,m)$ between the i-th and (i+1)th channels corresponding respectively to time differences $m = 1, 2, \ldots L$, where L is the maximum number of the delay-line taps.

A similar set of circuits are provided for the other channel. Unit delay elements 705 are connected in series to the other channel to form a second tapped delay line. Multipliers 706 are connected to the second delay-line taps to respectively multiply the successively delayed data samples with a data sample supplied from the first channel. The outputs of multipliers 706 are connected to integrators 707, respectively, whose outputs are fed to corresponding ones of absolute value conversion circuits 710. The outputs of integrators 707 respectively indicate the m elements of the cross-correlation function $R_{i,i+1}(n,m)$ corresponding to time differences $m = -1, -2, \ldots -L$, respectively.

Additionally, a multiplier 708 is provided for mutually multiplying data samples on the two input channels and an integrator 709 for integrating the multiplier output to produce an output representing the cross-correlation function $R_{i,i+1}(n,o)$ corresponding to time difference $m = 0$. The output of integrator 709 is converted by one of the absolute value conversion circuits 710 and applied to maximum value detector 711. In a practical aspect, each of the integrators 704, 707 and 709 may be implemented with a transversal filter, or an average circuit, or a recursive integrator.

Maximum value detector 711 of each time difference estimator $700_i$ detects a maximum of the absolute value inputs from circuits 710 and supplies a signal to a corresponding input of the controller 103 as an estimate of the propagation time difference between the signals of the i-th and (i+1)th channels.

In the previous embodiments, adaptive filters 104 quickly adapt themselves to change their filter coefficients in response to changes in delay time differences. However, under noisy environment it is desirable to prevent the echo canceller from quickly responding to changes in time differences. Additionally, it is preferable to disable the updating of filter coefficients with the error signals under such unfavorable conditions.

To this end, a modified version of the controller 103 is shown in FIG. 8 in which a delay unit 800 is connected to the outputs of time difference estimators unit 101 to introduce a unit delay time. A comparator 801 is connected to the input terminals and output terminals of delay unit 800 for making comparisons between each of the delayed versions of the time difference signals and a corresponding non-delayed version of the signals. As shown in FIG. 9, comparator 801 produces an output pulse when there is a mismatch between each of the delayed input signals and the corresponding non-delayed input signal. A timer, or preset counter 802 is connected to the output of the comparator 801 to generate a pulse in response to a comparator mismatch output, while it starts incrementing its count. When the count reaches a predetermined value, the output of timer 802 switches to a low level. The output pulse of timer 802 is applied to the minimum propagation delay detector 300 and coefficient vector selector 301 as a disable pulse so that they do not respond to changes in their input signals for a prescribed interval set by the timer 802. If the input signal contains noise, successive insignificant changes may occur in the outputs of the time difference estimators unit 101. However, the outputs of the minimum propagation delay detector 300 and coefficient vector selector 301 are insensitive to these changes and keep their previous output signals. The modified controller 103 further includes a second timer 803, which may have a different time-out period from that of the first timer 802. Timer 803 also responds to the output of the comparator 801 by generating a pulse which is supplied to an update control 804 whose output is coupled to the adaptive filters 104. When the output of timer 803 is low, update control supplies an update enable command to adaptive filters 104, and when the timer 803 output is high, it supplies an update disable command instead. Thus, under noisy conditions, adaptive filters 104 are prevented from updating the contents of its coefficient memories 403 during a prescribed period set by the timer 803.

What is claimed is:

1. In a teleconferencing system having a pair of transmit channels and a pair of receive channels interconnecting separated conference rooms, each of said conference rooms having a pair of microphones and a pair of loudspeakers connected by said transmit and receive channels to corresponding loudspeakers and microphones of the other conference room, an echo canceller located in each of said conference rooms, the echo canceller of each conference room comprising:

a pair of subtractors connected respectively in said transmit channels for respectively receiving transmit signals from the microphones of the conference room and cancelling an echo contained in each of the received transmit signals with a cancelling signal;

inter-channel time difference estimator means for receiving distant signals from said receive channels and estimating a propagation time difference between the received distant signals to produce a time-difference estimate signal;

control means for receiving the distant signals through said receive channels and responsive to the time-difference estimate signal for selecting one of the received distant signals having a largest content of echo components and identifying one of a plurality of vectors; and a pair of adaptive filters associated respectively with said subtractors and connected to said control means for receiving said selected distant signal, each of said adaptive filters having a plurality of said vectors each comprising a set of filter coefficients, each of said adaptive filters selecting the filter coefficients of the vector identified by said control means for filtering said selected distant signal to derive an echo replica and supplying the echo replica to the associated subtractor as said cancelling signal, the filter coefficients of said identified vector of each adaptive filter being variable according to an output signal from the associated subtractor.

2. In a teleconferencing system having a plurality of transmit channels and a plurality of receive channels interconnecting separated conference rooms, each of said conference rooms having a set of microphones and a set of loudspeakers connected by said transmit and receive channels to corresponding loudspeakers and microphones of the other conference room, an echo canceller located in each of said conference rooms, the echo canceller of each conference room comprising:

a plurality of subtractors connected respectively in said transmit channels for respectively receiving transmit signals from the microphones of the conference room and cancelling an echo contained in each of the received transmit signals with a cancelling signal;

a plurality of inter-channel time difference estimators for receiving distant signals from said receive channels and estimating propagation time differences between pairs of adjacent receive channels to produce a plurality of time-difference estimate signals;

control means for receiving the distant signals through said receive channels and responsive to the time-difference estimate signals for selecting one of the received distant signals having a largest content of echo components and identifying one of a plurality of vectors; and a plurality of adaptive filters associated respectively with said subtractors and connected to said control means for receiving said selected distant signal, each of said adaptive filters having a plurality of said vectors each comprising a set of filter coefficients, each of said adaptive filters selecting the filter coefficients of the vector identified by said control means for filtering said selected distant signal to derive an echo replica and supplying the echo replica to the associated subtractor as said cancelling signal, the filter coefficients of said identified vector of each adaptive filter being variable according to an output signal from the associated subtractor.

3. In a teleconferencing system having a pair of transmit channels and a pair of receive channels interconnecting separated conference rooms, each of said conference rooms having a pair of microphones and a pair of loudspeakers connected by said transmit and receive channels to corresponding loudspeakers and microphones of the other conference rooms, the echo canceller of each conference room comprising:

a pair of subtractors connected respectively in said transmit channels for respectively receiving transmit signals from the microphones of the conference room and cancelling an echo contained in each of the received transmit signals with a cancelling signal;

inter-channel time difference estimator means for receiving distant signals from said receive channels and estimating a propagation time difference between the received distant signals to produce a time-difference estimate signal;

control means for receiving the distant signals through said receive channels and responsive to the time-difference estimate signal for selecting one of the received distant signals having a minimum propagation delay and identifying one of a plurality of vectors; and a pair of adaptive filters associated respectively with said subtractors and connected to said control means for receiving said selected distant signal, each of said adaptive filters having a plurality of said vectors each comprising a set of filter coefficients, each of said adaptive filters selecting the filter coefficients of the vector identified by said control means for filtering said selected distant signal to derive an echo replica and supplying the echo replica to the associated subtractor as said cancelling signal, the filter coefficients of said identified vector of each adaptive filter being variable according to an output signal from the associated subtractor.

4. In a teleconferencing system having a plurality of transmit channels and a plurality of receive channels interconnecting separated conference rooms, each of said conference rooms having a set of microphones and a set of loudspeakers connected by said transmit and receive channels to corresponding loudspeakers and microphones of the other conference room, an echo canceller located in each of said conference rooms, the echo canceller of each conference room comprising:

a plurality of subtractors connected respectively in said transmit channels for respectively receiving transmit signals from the microphones of the conference room and cancelling an echo contained in each of the received transmit signals with a cancelling signal;

a plurality of inter-channel time difference estimators for receiving signals from said receive channels and estimating propagation time differences between pairs of adjacent receive channels to produce a plurality of time-difference estimate signals;

control means for receiving the distant signals through said receive channels and responsive to the time-difference estimate signals for selecting one of the received distant signals having a minimum propagation delay and identifying one of a plurality of vectors; and a plurality of adaptive filters associated respectively with said subtractors and connected to said control means for receiving said selected distant signal, each of said adaptive filters having a plurality of said vectors each comprising a set of filter coefficients, each of said adaptive filters selecting the filter coefficients of the vector identified by said control means for filtering said selected distant signal to derive an echo replica and supplying the echo replica to the associated subtractor as said cancelling signal, the filter coefficients of said identified vector of each adaptive filter being variable according to an output signal from the associated subtractor.

5. An echo canceller as claimed in claim 1 or 3, further comprising:

detector means for detecting a change in said time-difference estimate signal; and means responsive to the detection of a change by said detector means for disabling said control means for a predetermined interval.

6. An echo canceller as claimed in claim 5, further comprising means responsive to the detection of a change by said detector means for preventing said adaptive filters from updating the filter coefficients of said identified vector for a predetermined interval.

7. An echo canceller as claimed in claim 6, wherein said detector means includes delay means for delaying said time-difference estimate signal to produce a delayed version of said time-difference estimate signal, and comparator means for comparing the delayed version of said time-difference estimate signal and a non-delayed version of said time-difference estimate signal for disabling said control means for a predetermined period when there is a difference between the delayed and non-delayed versions of said time-difference estimate signal.

8. An echo canceller as claimed in claim 5, wherein said detector means includes delay means for delaying said time-difference estimate signal to produce a delayed version of said time-difference estimate signal, and comparator means for comparing the delayed version of said time-difference estimate signal and a non-delayed version of said time-difference estimate signal for disabling said control means for a predetermined period when there is a difference between the delayed and non-delayed versions of said time-difference estimate signal.

9. An echo canceller as claimed in claim 1 or 3, further comprising:

detector means for detecting a change in said time-difference estimate signal; and means responsive to the detection of a change by said detector means for preventing said adaptive filters from updating the filter coefficients of said identified vector for a predetermined interval.

10. An echo canceller as claimed in claim 9, wherein said detector means includes delay means for delaying said time-difference estimate signal to produce a delayed version of said time-difference estimate signal, and comparator means for comparing the delayed version of said time-difference estimate signal and a non-delayed version of said time-difference estimate signal for disabling said control means for a predetermined period when there is a difference between the delayed and non-delayed versions of said time-difference estimate signal.

11. An echo canceller as claimed in claim 1, 2, 3 or 4 wherein said inter-channel time difference estimator means comprises:
- a first adaptive filter having an input port connected to a first one of said receive channels and a plurality of adjustable filter coefficients;
- a first subtractor having a first input port connected to an output port of the first adaptive filter and a second input port connected to a second one of said receive channels and supplying a difference output to said first adaptive filter for controlling the filter coefficients thereof;
- a second adaptive filter having a first input port connected to said second one of said receive channels and a plurality of adjustable filter coefficients;
- a second subtractor having a first input port connected to an output port of the second adaptive filter and a second input port connected to said first one of said receive channels and supplying a difference output to said second adaptive filter for controlling the filter coefficients thereof;
- first means, connected to said first and second adaptive filters, for converting the filter coefficients of said first and second adaptive filters to a plurality of absolute values; and
- second means, connected to said first means, for detecting a maximum absolute value from said plurality of said absolute values.

12. An echo canceller as claimed in claim 1, 2, 3 or 4 wherein said inter-channel time difference estimator means comprises:
- a first tapped delay line connected to a first one of said receive channels;
- a plurality of first multipliers connected respectively to successive taps of said first tapped delay line, said first multipliers respectively providing multiplication on signals at said successive taps of the first tapped delay line and a signal from a second one of the receive channels;
- a plurality of first integrators connected respectively to outputs of said first multipliers;
- a second tapped delay line connected to said second one of said receive channels;
- a plurality of second multipliers connected respectively to successive taps of said second tapped delay line, said second multipliers respectively providing multiplication on signals at said successive taps of the second tapped delay line and a signal from said first one of the receive channels;
- a plurality of second integrators connected respectively to outputs of said second multipliers;
- a third multiplier for providing multiplication on signals from said first and second ones of said receive channels;
- a third integrator connected to an output of the third multiplier;
- first means, connected to said first, second and third integrators, for converting output signals from said first, second and third integrators to a plurality of absolute values; and
- second means, connected to said first means, for detecting a maximum absolute value from said plurality of said absolute values.

13. An echo canceller as claimed in claim 1, 2, 3 or 4 wherein each of said adaptive filters comprises:
- a data memory for storing samples of the signal selected by said control means;
- a plurality of coefficient memories respectively corresponding to said vectors of filter coefficients, each of the coefficient memories storing a corresponding one of said vectors; and
- means for multiplying an output signal from the associated subtractor with a sample stored in said data memory to produce a correction value, summing the correction value with a previous value of the filter coefficient in one of the coefficient memories corresponding to the vector identified by the control means to produce an updated value, and writing the updated value into said one coefficient memory as a filter coefficient, successively multiplying each filter coefficient in said one coefficient memory with a successive sample in said data memory to produce a plurality of products, and summing said products to produce the echo replica for the adaptive filter.

14. An echo canceller as claimed in claim 2 or 4, further comprising:
- detector means for detecting a change in said time-difference estimate signals; and
- means responsive to the detection of a change by said detector means for disabling said control means for a predetermined interval.

15. An echo canceller as claimed in claim 14, wherein said detector means includes delay means for delaying said time-difference estimate signals to produce delayed versions of said time-difference estimate signals, and comparator means for comparing the delayed versions of said time-difference estimate signals and non-delayed versions of said time-difference estimate signals for disabling said control means for a predetermined period when there is a difference between the delayed versions and non-delayed versions of said time-difference estimate signals.

16. An echo canceller as claimed in claim 2 or 4, further comprising:
- detector means for detecting a change in said time-difference estimate signals; and
- means responsive to the detection of a change by said detector means for preventing said adaptive filters from updating the filter coefficients of said identified vector for a predetermined interval.

17. An echo canceller as claimed in claim 16, wherein said detector means includes delay means for delaying said time-difference estimate signals to produce delayed versions of said time-difference estimate signals, and comparator means for comparing the delayed versions of said time-difference estimate signals and non-delayed versions of said time-difference estimate signals for disabling said control means for a predetermined period when there is a difference between the delayed versions and non-delayed versions of said time-difference estimate signals.

18. In an echo canceller for a teleconferencing system having a plurality of transmit channels and a plurality of receive channels interconnecting separated conference rooms, each of said conference rooms having an echo canceller, a set of microphones and a set of loudspeakers connected by said transmit and receive channels to corresponding loudspeakers and microphones of the other conference room, the echo canceller of each conference room comprising a plurality of subtractors connected respectively in said transmit channels for respectively receiving transmit signals from the microphones of the conference room and cancelling an echo contained in each of the transmit signals with a cancelling signal, and a plurality of adaptive filters associated respectively with said subtractors, each of said adaptive filters having a plurality of vectors each comprising a set of filter coefficients, the filter coefficients of each vector being variable according to an output signal from the associated subtractor, each of said adaptive filters filtering an input signal applied thereto using one of said vectors to derive an echo replica and supplying the echo replica to the associated subtractor as said cancelling signal, a method comprising:

a) receiving distant signals from said receive channels and estimating propagation time differences between pairs of the received distant signals of adjacent receive channels to produce a plurality of time-difference estimate signals;

b) selecting one of said distant signals from said receive channels as having a largest content of echo components according to said time-difference estimate signals and supplying said selected distant signal to said adaptive filters as said input signal; and c) identifying one of said vectors of said adaptive filters according to said time-difference estimate signals and said selected distant signal and causing each of said adaptive filters to use the identified vector.

19. In an echo canceller for a teleconferencing system having a plurality of transmit channels and a plurality of receive channels interconnecting separated conference rooms, each of said conference rooms having an echo canceller, a set of microphones and a set of loudspeakers connected by said transmit channels and said receive channels to corresponding loudspeakers and microphones of the other conference room, the echo canceller of each conference room comprising a plurality of subtractors connected respectively in said transmit channels for respectively receiving transmit signals from the microphones of the conference room and cancelling an echo contained in each of the transmit signals with a cancelling signal, and a plurality of adaptive filters associated respectively with said subtractors, each of said adaptive filters having a plurality of vectors each comprising a set of filter coefficients, the filter coefficients of each vector being variable in proportion to an output signal from the associated subtractor, each of said adaptive filters filtering an input signal applied thereto using one of said vectors to derive an echo replica and supplying the echo replica to the associated subtractor as said cancelling signal, a method comprising:

a) receiving distant signals from said receive channels and estimating propagation time differences between pairs of the received distant signals of adjacent receive channels to produce a plurality of time-difference estimate signals;

b) selecting one of said distant signals from said receive channels as having a minimum propagation delay according to said time-difference estimate signals and supplying said selected distant signal to said adaptive filters as said input signal; and c) identifying one of said vectors of said adaptive filters according to said time-difference estimate signals and said selected distant signal and causing each of said adaptive filters to use the identified vector.

20. A method as claimed in claim 18 or 19, further comprising the steps of detecting a change in said time-difference estimate signals, and disabling the step (b) for a predetermined interval from the instant said change is detected.

21. A method as claimed in claim 18 or 19, further comprising the steps of detecting a change in said time-difference estimate signals, and preventing said adaptive filters from updating the filter coefficients of said identified vector for a predetermined interval from the instant said change is detected.

22. In an echo canceller for a teleconferencing system having a pair of transmit channels and a pair of receive channels interconnecting separated conference rooms, each of said conference rooms having an echo canceller, a pair of microphones and a pair of loudspeakers connected by said transmit and receive channels to corresponding loudspeakers and microphones of the other conference room, the echo canceller of each conference room comprising a pair of subtractors connected respectively in said transmit channels for respectively receiving transmit signals from the microphones of the conference room and cancelling an echo contained in each of the transmit signals with a cancelling signal, and a pair of adaptive filters associated respectively with said subtractors, each of said adaptive filters having a plurality of vectors each comprising a set of filter coefficients, the filter coefficients of each vector being variable according to an output signal from the associated subtractor, each of said adaptive filters filtering an input signal applied thereto using one of said vectors to derive an echo replica and supplying the echo replica to the associated subtractor as said cancelling signal, a method comprising:

a) receiving distant signals from said receive channels and estimating a propagation time difference between the received distant signals to produce a time-difference estimate signal;

b) selecting one of said distant signals from said receive channels as having a largest content of echo components according to said time-difference estimate signal and supplying said selected distant signal to said adaptive filters as said input signal; and c) identifying one of said vectors of said adaptive filters according to said time-difference estimate signal and said selected distant signal and causing each of said adaptive filters to use the identified vector.

23. In an echo canceller for a teleconferencing system having a pair of transmit channels and a pair of receive channels interconnecting separated conference rooms, each of said conference rooms having an echo canceller, a pair of microphones and a pair of loudspeakers connected by said transmit channels and said receive channels to corresponding loudspeakers and microphones of the other conference room, the echo canceller of each conference room comprising a pair of subtractors connected respectively in said transmit channels for respectively receiving transmit signals from the microphones of the conference room and cancelling an echo contained in each of the transmit signals with a cancelling signal, and a pair of adaptive filters associated respectively with said subtractors, each of said adaptive filters having a plurality of vectors each comprising a set of filter coefficients, the filter coefficients of each vector being variable according to an output signal from the associated subtractor, each of said adaptive filters filtering an input signal applied thereto using one of said vectors to derive an echo replica and supplying the echo replica to the associated subtractor as said cancelling signal, a method comprising:

a) receiving distant signals from said receive channels and estimating a propagation time difference between the received distant signals to produce a time-difference estimate signal;

b) selecting one of said distant signals from said receive channels as having a minimum propagation delay according to said time-difference estimate signal and supplying said selected distant signal to said adaptive filters as said input signal; and c) identifying one of said vectors of said adaptive filters according to said time-difference estimate signal and said selected distant signal and causing each of said adaptive filters to use the identified vector.

24. A method as claimed in claim 22 or 23, further comprising the steps of detecting a change in said time-difference estimate signal, and disabling the step (b) for a predetermined interval from the instant said change is detected.

25. A method as claimed in claim 22 or 23, further comprising the steps of detecting a change in said time-difference estimate signal, and preventing said adaptive filters from updating the filter coefficients of said identified vector for a predetermined interval from the instant said change is detected.

* * * * *